E. J. GUENZEL.
HAT FASTENER.
APPLICATION FILED JUNE 26, 1915.
1,254,899.
Patented Jan. 29, 1918.
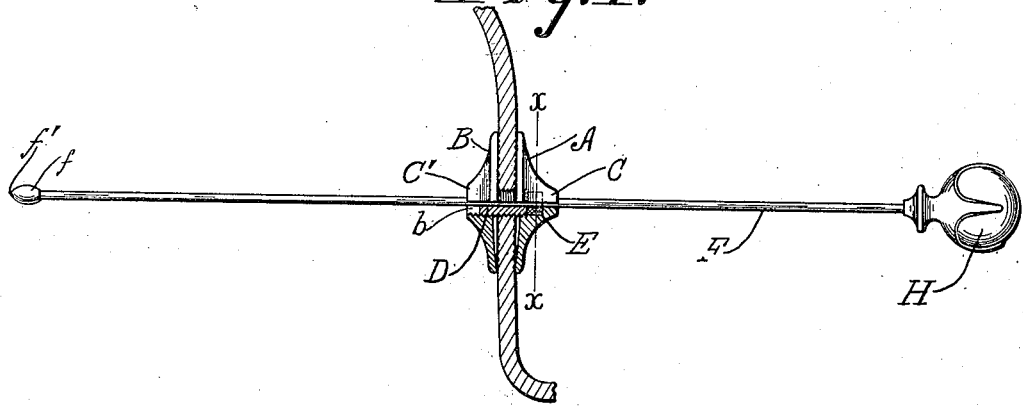
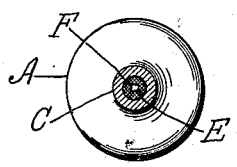
Witnesses
Inventor
Ernst J. Guenzel
By Erwin & Wheeler
Attorneys

UNITED STATES PATENT OFFICE.

ERNST J. GUENZEL, OF MILWAUKEE, WISCONSIN.

HAT-FASTENER.

1,254,899. Specification of Letters Patent. Patented Jan. 29, 1918.

Application filed June 26, 1915. Serial No. 36,425.

*To all whom it may concern:*

Be it known that I, ERNST J. GUENZEL, a citizen of the United States, residing at Milwaukee, county of Milwaukee, and State of Wisconsin, have invented new and useful Improvements in Hat-Fasteners, of which the following is a specification.

My invention relates to improvements in hat fasteners.

The object of my invention is to provide means for detachably connecting a hat pin with the crown of a hat in such a manner that the pin will be held in any desired position of adjustment and will be capable of adjustment to either a retaining or releasing position without removing it from the hat. Also to provide a form of structure whereby the inner end of the pin may be provided with a tapered or rounded head instead of being pointed in the usual manner, the structure being such that the rounded head will not catch or become entangled in the hair of the wearer and will not interfere with the removal of the hat when the pin is adjusted to releasing position.

In the drawings—

Figure 1 is a view showing a fragment of the crown of a hat with my improved hat fastener connected therewith in position for use, the clamping members being shown partially in vertical section.

Fig. 2 is a sectional view drawn on line *x*—*x* of Fig. 1.

Like parts are identified by the same reference characters in both views.

A pair of clamping members A and B are each provided with a conically tapered, outwardly projecting hub portion C, C', respectively. The members A and B are suitably socketed or apertured to receive a tubular connecting screw B and also a packing ring E through which the screw D and hat pin F pass. Preferably the member A is provided with an aperture which at the outer end of the hub C is of such diameter that the pin F fits snugly therein. The inner portion of the aperture, however, is enlarged to receive the packing ring E and is also threaded to receive the tubular screw D. The member B is provided with a threaded aperture at the axis which also receives the screw D. The two members A and B are clamped upon the outer and inner faces of the hat crown by rotating one or both of them upon the screw D. When the member A is rotated upon the screw D, pressure is applied to the packing ring E which causes it to bind upon the pin F.

The inner end of the pin F is provided with a small head *f* tapered to a blunt point at *f'*. The opposite end of the head *f* is adapted to be received in the socket *b* which constitutes a portion of the aperture in the member B which receives the screw D. The head *f* is therefore adapted to limit the outward movement of the hat pin F, but owing to the fact that the head is seated in the socket *b* with only the pointed portion projecting, it is obvious that it will not interfere with the removal of the hat. The outer end of the hat pin F is provided with an ordinary head H.

I do not limit the scope of my invention to the specific form or shape of the clamping members nor to the means by which they are secured together and I do not regard it as essential that the screw D should have threaded engagement with both members as distinguished from the rigid engagement with one of them. It is desirable, however, that the packing ring E should be so constructed that when the clamping members are adjusted to clamping position upon the crown of a hat, the packing ring will be compressed upon the hat pin, thereby producing sufficient frictional resistance to retain the pin in any desired position of adjustment. It is also desirable that the opening in the screw D through which the pin passes and also the opening in the outer extremity of the hub portion C of the member A should be of such diameter that the pin will snugly fit therein, thereby providing bearings for the pin at points sufficiently distant from each other to support the pin on opposite sides of the packing. This not only tends to prevent the pin from vibrating, but it also prevents such vibrations as may occur from effecting the frictional pressure of the packing and decreasing its retentive quality.

I claim—

1. A hat fastener comprising the combination with a hat pin, of a set of clamping members adapted to respectively engage the inner and outer faces of a hat crown, said members having a tubular passage through which the pin extends, and motion resisting means in said passage adapted for frictional pressure upon the pin, the inner clamping member having a socket at the inner end of said passage, and the pin having an inner tapered head adapted to be received in said socket when the hat pin is in releasing position.

2. A hat fastener comprising the combination with a hat pin, of a pair of clamping members adapted to respectively engage the inner and outer faces of a hat crown and provided with alining passages, the outer portion of the passage of the outer clamping member being reduced to substantially the diameter of the hat pin, motion resisting means in the passage of the outer clamping member adjacent its reduced portion and adapted for frictional pressure upon the pin, a screw threaded in the passages of the clamping members to secure them together and engage the motion resisting means, said screw having a passage therethrough for the pin and having its corresponding end spaced inwardly from the outer end of the passage of the inner clamping member to define a socket, and the hat pin having an inner head adapted to be received in said socket when the pin is in releasing position.

3. A hat fastener, comprising the combination with a hat pin, of a pair of clamping disks adapted to respectively engage the inner and outer faces of a hat crown, conically tapered, outwardly projecting hubs on said disks provided with alining passages, the passage of the hub of the outer disk being reduced at its outer portion to substantially the diameter of the hat pin, pressure resisting means in the last named passage adjacent its reduced portion, a screw threaded in the passages for securing the disks together, and for engaging the motion resisting means, said screw being provided with a passage for the hat pin and having its corresponding end spaced inwardly from the outer end of the passage of the inner disk hub to define a socket and the hat pin having an inner head adapted to be received in said socket when the pin is in a retracted position.

In testimony whereof I affix my signature in the presence of two witnesses.

ERNST J. GUENZEL.

Witnesses:
 LEVERETT C. WHEELER,
 IRMA D. BREMER.

Copies of this patent may be obtained for five cents each, by addressing the "Commissioner of Patents, Washington, D. C."